United States Patent
Wexler et al.

(10) Patent No.: US 8,204,986 B2
(45) Date of Patent: Jun. 19, 2012

(54) MULTI-HIERARCHY LATENCY MEASUREMENT IN DATA CENTERS

(75) Inventors: Asaf Wexler, Raanana (IL); Netta Gavrieli, Ramat-Gan (IL)

(73) Assignee: VMware, Inc., Palo Alto, CA (US)

( * ) Notice: Subject to any disclaimer, the term of this patent is extended or adjusted under 35 U.S.C. 154(b) by 80 days.

(21) Appl. No.: 12/181,260

(22) Filed: Jul. 28, 2008

(65) Prior Publication Data

US 2009/0031022 A1 Jan. 29, 2009

Related U.S. Application Data

(60) Provisional application No. 60/952,541, filed on Jul. 27, 2007.

(51) Int. Cl.
*G06F 15/173* (2006.01)

(52) U.S. Cl. ........................................................ 709/224

(58) Field of Classification Search .................. 709/224, 709/226; 718/104, 5
See application file for complete search history.

(56) References Cited

U.S. PATENT DOCUMENTS

| | | | | |
|---|---|---|---|---|
| 6,757,543 | B2 * | 6/2004 | Moran et al. | 455/456.1 |
| 6,775,794 | B1 * | 8/2004 | Horst et al. | 714/42 |
| 6,868,094 | B1 * | 3/2005 | Bordonaro et al. | 370/516 |
| 7,599,308 | B2 * | 10/2009 | Laver et al. | 370/252 |

* cited by examiner

*Primary Examiner* — David Eng

(57) ABSTRACT

A method for monitoring performance of a data center that includes: (a) a performance monitor analyzing packets that flow between a client and a web or application server; (b) assigning packets to contexts where a context is a request-reply entity; (c) determining one or more of application, network, and back-end latency measures wherein: (i) the application latency measure is a time it takes for an application to respond to a request, (ii) the network latency measure is a time that it takes for packets to go through a network between the client and the web or application server, and (iii) the back-end latency is a time required for a back-end system to execute a request and respond to the application server.

20 Claims, 12 Drawing Sheets

MULTI-HIERARCHY LATENCY MEASUREMENT IN DATA CENTERS

This application claims the benefit of U.S. Provisional Application No. 60/952,541, filed Jul. 27, 2007, which provisional application is incorporated herein by reference in its entirety.

BACKGROUND

Enterprises and organizations expose their business information and functionality on the web through software applications, usually referred to as "web applications" which use Internet technologies and infrastructures. Web applications are generally: (a) event-driven software programs which react to hypertext transfer protocol (HTTP) requests from a client, and (b) executed on application servers coupled to back-end systems.

FIG. 1 shows an exemplary data center 100 that is utilized for executing web applications. As indicated in FIG. 1, clients 110-1-100-N submit requests (for example, HTTP requests) to web servers 120-1-120-M through network 170. Load balancer 160 distributes the requests among web servers 120-1-120-M to balance the load. Web servers 120-1-120-M dynamically generate a presentation using servlets, extensible markup language (XML), extensible style-sheet language (XSL), or the like. Application servers 130-1-130-Q are often responsible for deploying and running a business logic layer and for interacting with and integrating various enterprise-wide resources, such as web servers 120-1-120-M, and back-end systems 150. Back-end systems 150 may include, for example, a database and a legacy system.

In the prior art there are many tools to monitor the operation and performance of data centers to prevent situations such as an unpredictable level of service and an uncontrolled user experience from occurring. Typically, such monitoring tools provide a fault management or performance management function where: (a) fault management pertains to whether a component (a device or an application) is operating or not, and (b) performance management pertains to a measure of how well a component is working and to historical and future trends.

Existing performance management tools typically measure performance parameters, such as latency, errors, and throughput, which may be influenced by different systems in a path. For example, a latency measure typically encompasses an entire duration between sending a request from a client (for example, one of clients 110-1-110-N) to an application server (for example, one of application servers 130-1-130-Q) and receiving the full reply. This information is not always sufficient to help a system administrator determine the source of latency problems. That is, a latency problem can be at: (a) network 170, (b) a web server (for example, one of web servers 120-1-120-M), (c) an application server (for example, one of application servers 130-1-130-Q), or (d) back-end systems 150.

SUMMARY

A method for monitoring performance of data centers. In particular, one embodiment of the present invention is a method for monitoring performance of a data center that comprises: (a) a performance monitor analyzing packets that flow between a client and a web or application server; (b) assigning packets to contexts where a context is a request-reply entity; (c) determining one or more of application, network, and back-end latency measures wherein: (i) the application latency measure is a time it takes for an application to respond to a request, (ii) the network latency measure is a time that it takes for packets to go through a network between the client and the web or application server, and (iii) the back-end latency is a time required for a back-end system to execute a request and respond to the application server.

DETAILED DESCRIPTION

Figure 1:
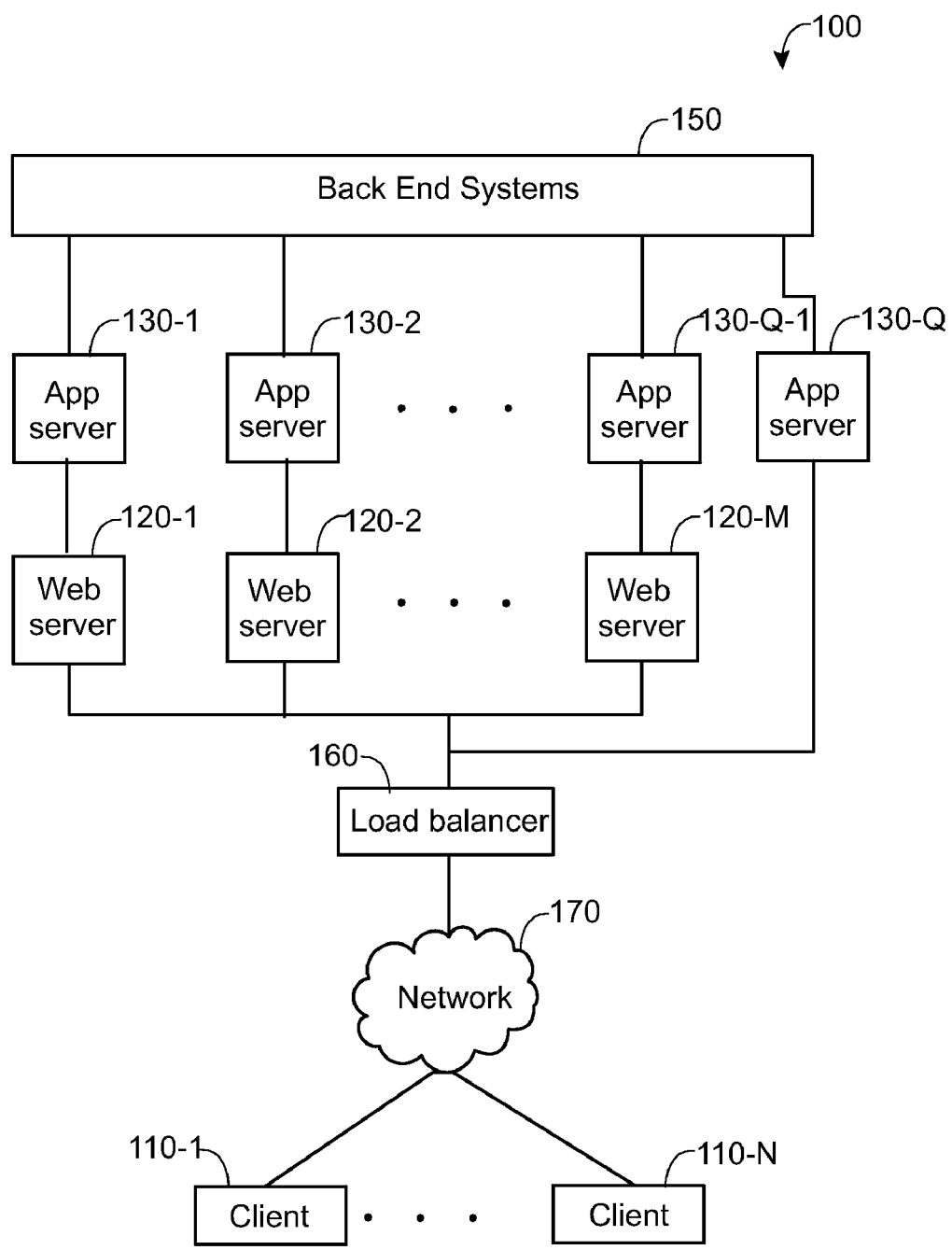
FIG. 1 shows an exemplary data center that is utilized for executing web applications.
Figure 2:
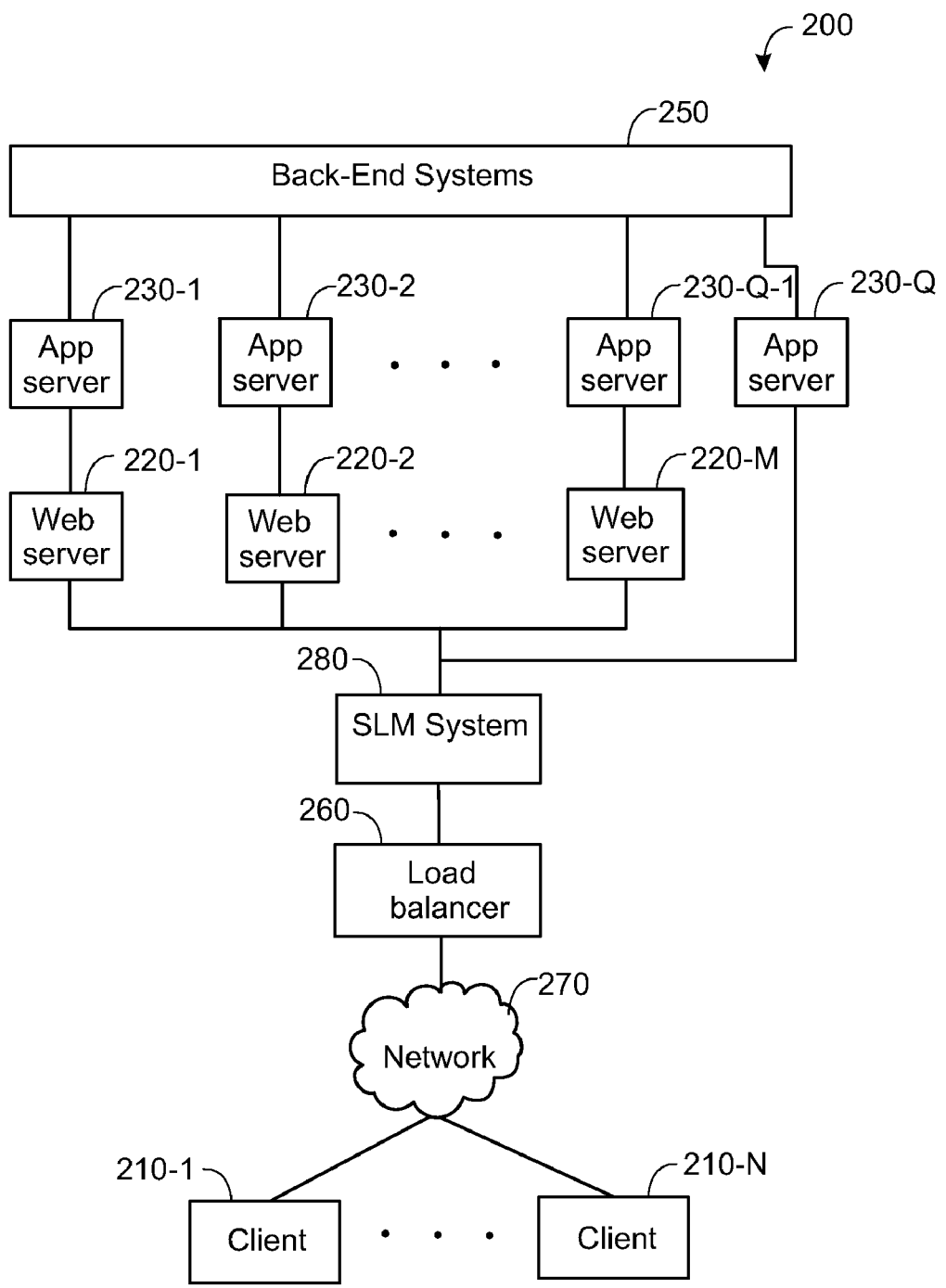
FIG. 2 shows an exemplary data center utilized to describe one or more embodiments of the present invention.

FIG. 2 shows exemplary data center 200 that is utilized to describe one or more embodiments of the present invention. As shown in FIG. 2, data center 200 includes web servers 220-1-220-M, application servers 230-1-230-Q that are connected to back-end systems 250, and load balancer 260. As further shown in FIG. 2, data center 200 includes service level management (SLM) system 280 that allows maintenance of a level of service of web applications. Web servers 220-1-220-M process requests sent from clients 210-1-210-N over network 270, and respond with a processing result. Application servers 230-1-230-Q execute business logic of web applications, and they communicate with back-end systems 250 which implement a data layer of the web applications. In some configurations, a web server and a web application may act as a single entity, for example, application server 230-Q. In addition, load balancer 260 distributes incoming requests to web servers 220-1-220-M and to application servers 230-1-230-Q that run web applications to which the requests are targeted.

In accordance with one or more embodiments, SLM system 280 controls and manages web applications executed by web servers 220-1-220-M and application servers 230-1-230-Q in real-time, and thus ensures a committed level of service. The level of service may be defined by a service level agreement (SLA), and it may be different for each web application. With this aim of ensuring a committed level of service, SLM system 280 learns the structure of a web-application, monitors the operation of the web application, and optionally controls the processing of incoming requests to achieve optimal performance and a committed level of service. As depicted in FIG. 2, SLM system 280 is configured to operate in the line of traffic, i.e., traffic passing directly through SLM system 280 to web servers 220-1-220-M. SLM system 280 may also operate as a passive "sniffing" device that is coupled between clients 210-1-210-N and web servers 220-1-220-M. The operation of SLM system 280 in accordance with one or more embodiments is described in the Appendix and in U.S. patent applications having application Ser. Nos. 11/682,426 and 11/682,433, which applications are assigned to a common assignee, and which applications are hereby incorporated by reference in their entirety.

To monitor the performance of data center 200, SLM system 280 acts as a performance monitor and receives hypertext transfer protocol (HTTP) requests from clients 210-1-210-N, as well as, replies sent from web servers 220-1-221-M and application servers 230-1-230-Q. SLM system 280 generates contexts, which contexts are joined HTTP request and HTTP response (or reply) entities. Context fields include, but are not limited to, a site name, an HTTP method, a URL, request parameters, HTTP cookies, an HTTP status code, an HTTP server, an HTTP content type, an HTTP content length, an HTML title field, and the like. The context is used to monitor and generate statistics respective of the operation of the web servers and their respective web applications.

In accordance with one or more embodiments of the present invention, SLM system 280 produces latency measures by monitoring and analyzing packets going between clients and servers. That is, for each context, SLM system 280 computes an application latency, a network latency, and a back-end latency where: (a) the application latency is the time that it takes for a web application to respond; (b) the network latency is the time that it takes for packets to go through network 270—this time includes server round-trip-time (RTT) and overhead (i.e., delays due to packet loss or other network failures)—as such, the network latency comprises latencies resulting from a client and a web server; and (c) the back-end latency is the time required for a back-end system to execute a request and respond to one of application servers 230-1-230Q. Note that the detailed latency measure is different from prior art approaches that measure only the time between sending a request to receiving a full response from a server. As such, the monitoring tasks executed by SLM system 280 generate information that allows a system administrator to detect a root-cause of latency problems.

Figure 3:
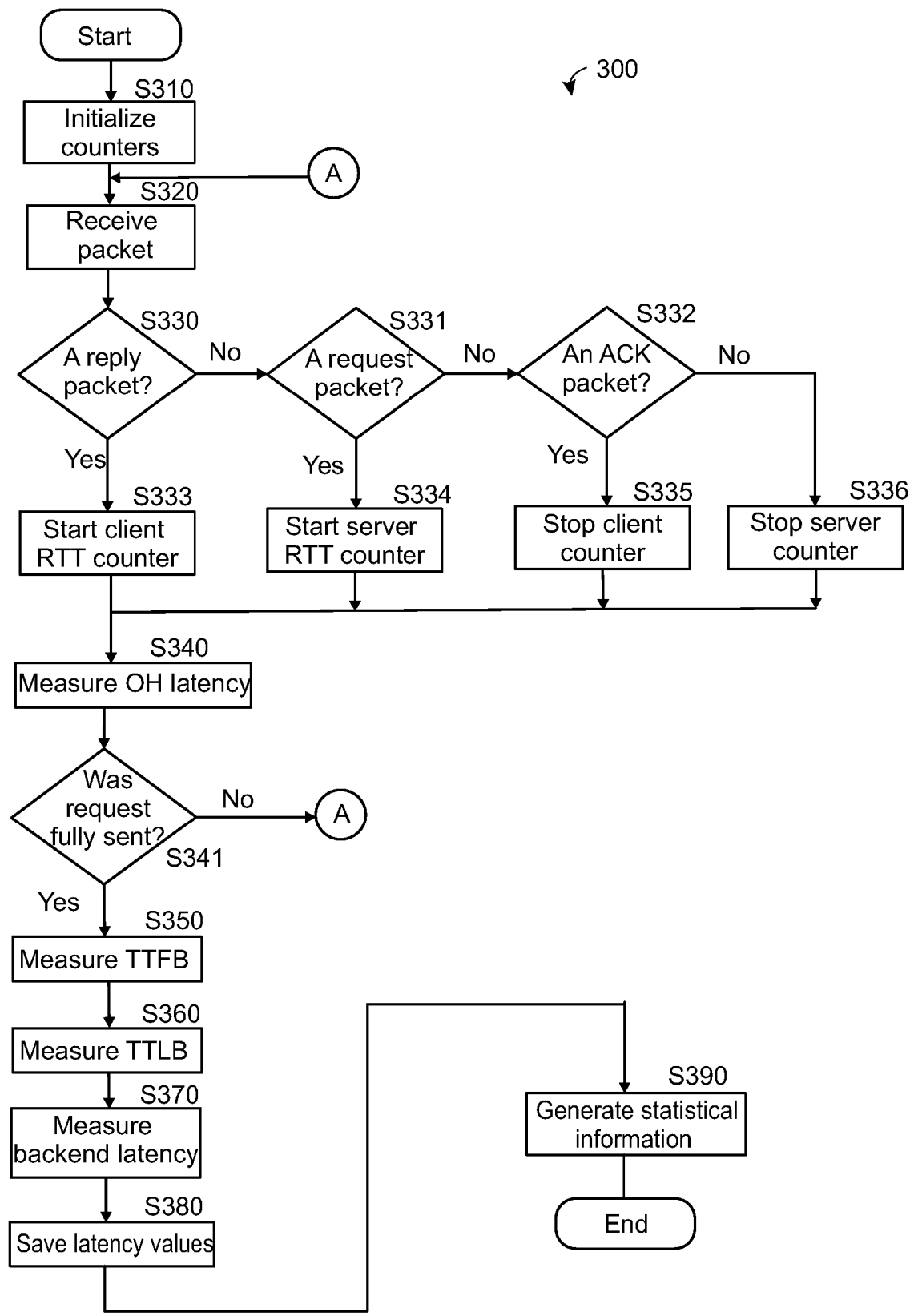
FIG. 3 shows a flowchart of a method for multi-hierarchy latency measurement in accordance with one or more embodiments of the present invention.

FIG. 3 shows flowchart 300 of a method for multi-hierarchy latency measurement that is fabricated in accordance with one or more embodiments of the present invention, which method provides measures of application latency, network latency, and back-end latency. As will be described below, a set of counters are used to determine the different latency measures, which counters include at least an application server time-to-first-byte (TTFB) counter, an application server time-to-last-byte (TTLB) counter, a web server-network TTLB counter, a client-network TTLB counter, a web server round-trip-time (RTT) counter, a client RTT counter, a back-end system TTFB counter, a client-network overhead counter, and a web server-network overhead counter. In accordance with one or more embodiments of the present invention, a set of these counters is used for each context, i.e., request-reply pair. In accordance with one or more embodiments of the present invention, the latency measures for client-network, web server-network, or application server are provided by summing the counters of the respective contexts. For example, to determine the delay introduced by an application server, an average is taken of all application server TTFB counters of all contexts related to the application server. Network latency is the time spent waiting for packets to go through the network (including RTT) and delays due to packet loss or other network trouble. It is separated into client network latency and server network latency, although this distinction is only useful if there is no network element that terminates TCP connections, such as some load balancers, caches, etc. Server RTT is the time between SLM system 280 seeing a packet headed to the server and SLM system 280 seeing its reply. Client RTT is the time between SLM system 280 seeing a packet headed to the client and SLM system 280 seeing its reply; RTT is the total of server RTT and client RTT. In particular, RTT is updated during the life of a connection, as follows: (a) time between a request packet and its ACK==>server RTT; and (b) time between a reply packet and its ACK==>client RTT.

Latency measures are determined as follows: once a request is fully sent, the latency measure is calculated by noting the time that passes between every two packets and deciding on the fly which type of latency measure it belongs to. A duration can be either application time, client network time or server network time. Application TTFB is the time between reception of the first packet of a request by a server and the server's sending the first packet of the request. It is calculated to be the time between SLM system 280 seeing the last packet of the request and SLM system 280 seeing the first packet of the reply, minus server RTT. In case of pipeline, replace "SLM system 280 seeing the last packet of the request" with "SLM system 280 seeing the last packet of the previous reply." There are three TTLB counters: application, client-network, and client-server. During the reply, SLM system 280 looks at all packets that arrive and determines the origin of latency using the following rules: (a) if the previous packet was a window size probe=>client-network; (b) if this is the first time this packet is seen (i.e., it is not a retransmission), and it is not a window size probe=>application; (c) if this is a resend of a packet that has been seen before out of order (meaning, packet N was missed, packet N+1 was seen, and now packet N+1 is being seen again)=>server-network; (d) if this is the first time a packet is seen, but the next packet has been seen (i.e., out of order)=>server-network; (e) otherwise, if this is a resend of a packet=>client-network; and (f) if this is a window size probe from the server=>client-network (this can change to be the client's application instead of network, if this differentiation matters). When the last packet of the reply arrives, SLM system 280 accumulates all the application latencies, all the server-network latencies (+1 server RTT) and all the client-network latencies (+1 client RTT) to make the 3 TTLB latency counters mentioned above.

In accordance with one or more such embodiments, all packets that flow between clients 210-1-210-N and web servers 220-1-220-M or application servers 230-1-230-Q are traced and analyzed by SLM system 280. Specifically, SLM system 280 looks at reply packets (i.e., packets sent from a server) and request packets (i.e., packets sent from a client), and decides on-the-fly to which of the latency measure(s) the packets contribute.

At step S310 of method 300 in FIG. 3, the set of counters are initialized to zero. Control is then transferred to step S320 of method 300.

At S320 of method 300, a packet is received by SLM system 280. Control is then transferred to decision step S330 of method 300.

At decision step S330 of method 300, SLM system 280 determines whether a received packet is a reply packet, i.e., it belongs to a reply, and if so, control is transferred to step S333 of method 300. Otherwise, control is transferred to decision step S331.

At decision step 331 of method 300, SLM system 280 determines whether the received packet is a request packet, i.e., it belongs to a request, and if so, control is transferred to step S334. Otherwise, control is transferred to decision step S332.

At decision step S332 of method 300, SLM system 280 determines whether the received packet is an acknowledgement (ACK) of a previous reply, and if so, control is transferred to step S335. Otherwise, control is transferred to step S336.

At step S333 of method 300, SLM system 280 starts a client RTT counter counting. Control is then transferred to step S340.

At step S334 of method 300, SLM system 280 starts a server RTT counter counting. Control is then transferred to step S340.

At step S335 of method 300, SLM system 280 stops the client RTT counter from counting. At this point, the client RTT counter reflects a time period between a reply packet and its ACK. Control is then transferred to step S340.

At step S336 of method 300, SLM system 280 stops the server RTT counter from counting. At this point, the server RTT counter reflects a time period between a request packet and its ACK. Control is then transferred to step S340.

At step S340 of method 300, SLM system 280 calculates client-network and server-network overhead (OH) latency measures which are due to client packet loss or server packet loss, respectively. In particular, client-network overhead latency is measured as the time elapsed between re-transmissions of reply packets that were lost in the client-network transmission, while server-network overhead latency is measured as the time elapsed between re-transmissions of reply packets that were lost in the server-network transmission. If a re-transmitted reply packet was inspected by SLM system 280, it contributes to the client-network overhead latency; otherwise, it is part of the server-network overhead latency. In the same manner, the server-network overhead latency is measured as the time elapsed between a re-transmission of a reply packet to the first time that the packet was transmitted. Control is then transferred to decision step S341 of method 300.

At decision step S341 of method 300, SLM system 280 determines whether a request from a client was fully sent, and if so, control is transferred to step S350. Otherwise, control is transferred to step S320.

At step S350 of method 300, SLM system 280 calculates the application server TTFB. This latency measure is defined as the time between reception of the request's first packet by the server and the reply's first packet as sent by the server. The calculation of this latency measure is performed by starting the TTFB counter as the last packet of the request is detected, and stopping the counter when the first packet of the reply is received at SLM system 280. Then, the server RTT time is subtracted from the counter value. Control is then transferred to step S360 of method 300.

At step S360 of method 300, SLM system 280 determines TTLB latency measures by examining each of the reply packet flows through SLM system 280, and determining to which of the TTLB latency measures it contributes. The execution of S360 is described in greater detail below. Control is then transferred to step S370.

At step S370 of method 300, SLM system 280 computes a back-end latency measure using the value of the application server TTLB counter and a back-end counter that measures time between a back-end system's receiving the last packet of the request and sending the first packet of the reply (back-end system TTFB). Together with the application server TTFB counter, the contribution to the latency measure of a network between an application server and a back-end system can be easily derived. Control is then transferred to step S380.

At step S380 of method 300, once a request-reply session is ended, SLM system 280 saves all values measured that are related to the context. This allows producing reports based on historical values of the measures. Control is then transferred to step S390 of method 300.

Figure 5:
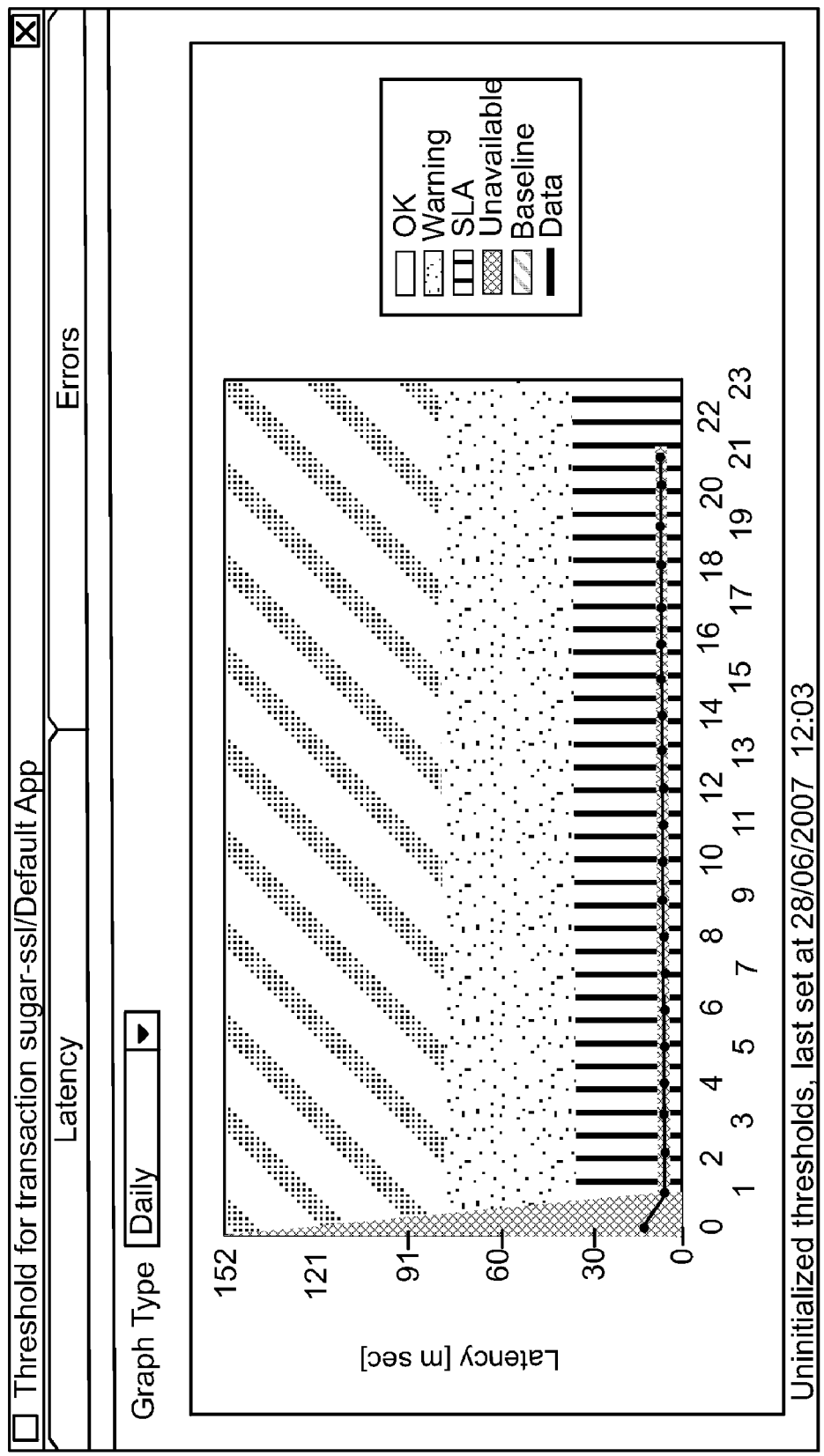
FIG. 5 is an exemplary graph showing a daily latency baseline.

At step S390 of method 300 in FIG. 3, using historic data, SLM system 280 computes statistics based on the latency measures. In accordance with one embodiment the statistical data includes minimum, maximum, average, and standard deviation values of the client-network, server-network, application server, and back-end system latencies. The statistical data may be generated for each client, server, back-end system, application and/or module within an application. The statistical data may be further produced for different durations of time (e.g., hours within a day, days in a week, and so on). The statistical data may be displayed as a series of graphs using a graphical user interface (GUI). An exemplary graph showing a daily latency baseline is provided in FIG. 5.

Figure 4:
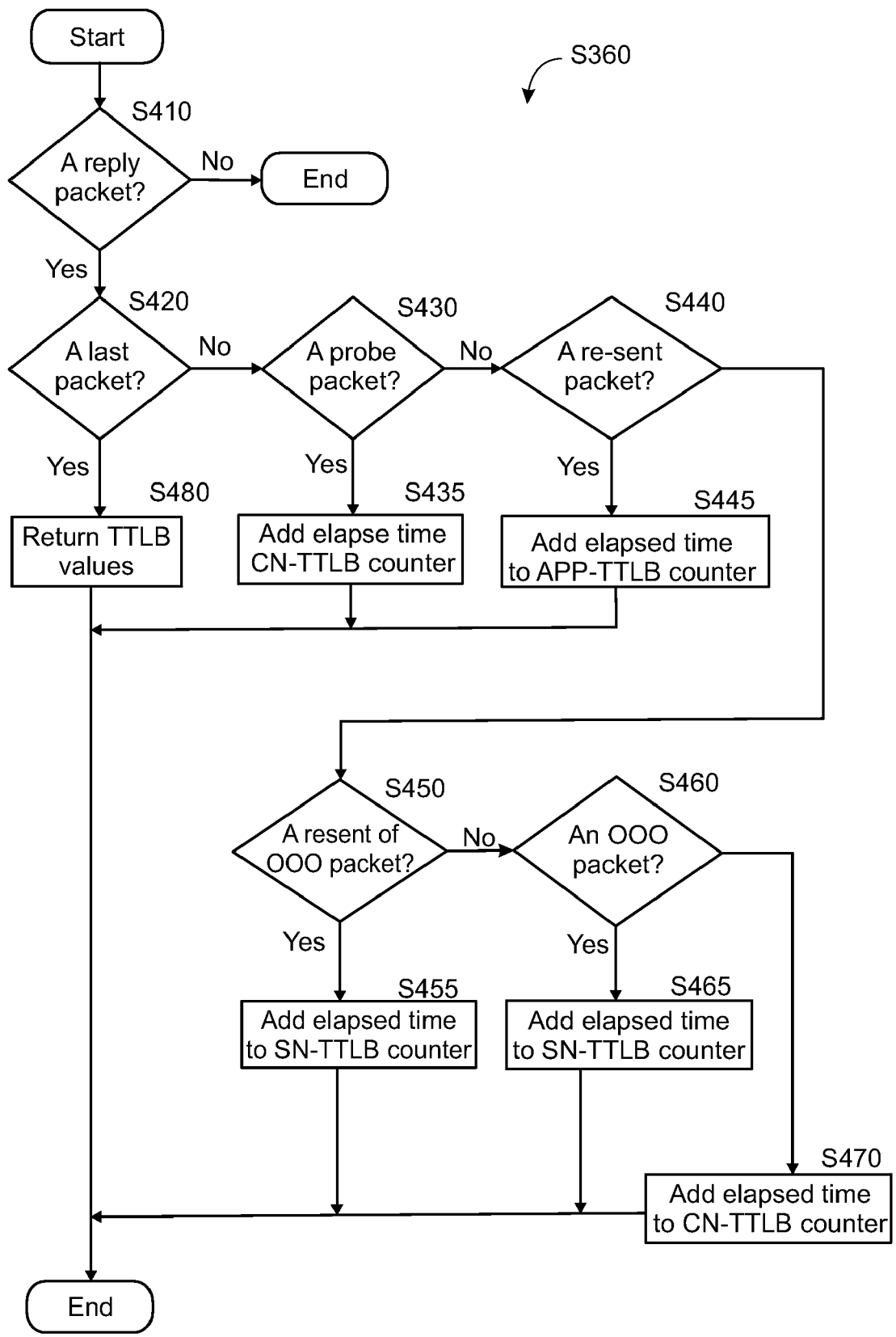
FIG. 4 shows a flowchart of a method for measuring application server time-to-last-byte (TTFB), client-network TTLB, and server-network TTLB latency measures in accordance with one or more embodiments of the present invention.

FIG. 4 shows flowchart S360 of a method for measuring application server TTLB, client-network TTLB, and server-network TTLB values (refer to step S360 above). As mentioned above, this is performed by examining reply packets received at SLM system 280.

At decision step S410 of method S360 in FIG. 4, SLM system 280 determines whether an incoming packet is a reply packet, and if so, control is transferred to decision step S420 of method S360. Otherwise, execution of method S360 terminates.

At decision step S420 of method S360, SLM system 280 determines whether the current packet is the last packet of a reply, and if so, control is transferred to step S480 of method S370. Otherwise, control is transferred to decision step S430.

At decision step S430 of method S360, SLM system 280 determines whether the current packet of the reply was a window-size probe packet (a window-size probe packet is sent by the server when the client is getting more data than it can handle to make sure the client notifies the server when it is ready for more data), and if so, control is transferred to step S435. Otherwise, control is transferred to decision step S440.

At decision step S440 of method S360, SLM system 280 determines whether the current packet of the reply was a re-transmitted packet, and if so, control is transferred to step S445. Otherwise, control is transferred to decision step S450.

At step S435 of method S360, SLM system 280 determines the time elapsed between the received packet and a previous packet (hereinafter "elapsed time") and adds the elapsed time to the client-network TTLB counter. Then, execution of method S360 terminates.

At step S445 of method S360, SLM system 280 adds the elapsed time to the application TTLB counter. Then, execution of method S360 terminates.

At decision step S450 of method S360, SLM system 280 determines whether the received packet contributes to the server-network TTLB latency. This is performed by determining whether the packet is a re-send of an out-of-order (OOO) packet—an out-of-order packet is a packet that is received without its preceding packet, for example, reception of a packet with a sequence number N+1 without receiving a packet having sequence number N. If so, control is transferred to step S455, otherwise, control is transferred to decision step S460.

At step S455 of method S360, SLM system 280 adds the elapsed time to the server-network TTLB counter. Then, execution of method S360 terminates.

At decision step S460 of method S360, SLM system 280 determines whether the received packet is an out-of-order packet. If so, control is transferred to step S465, otherwise, control is transferred to step S470.

At step S465 of method S360, SLM system 280 adds the elapsed time to the server-network TTLB counter. Then, execution of method S360 terminates.

At step S470 of method S360, SLM system 280 adds the elapsed time to the client-network TTLB counter. Then, execution of method S360 terminates.

At step S480 of method S360, the values of the three TTLB counters are returned.

In accordance with one or more embodiments of the present invention, some or all of SLM system 280 or the methods and processes described herein are implemented as computer executable code. Such computer executable code contains a plurality of computer instructions that when performed in a predetermined order result in the execution of tasks disclosed herein. Such computer executable code may be available as source code or in object code, and may be further comprised as part of, for example, a portable memory device or downloaded from the Internet, or embodied on a program storage unit or computer readable medium. Because some of the constituent system components and methods depicted in the accompanying drawings may be implemented in software, the actual connections between the system components or the process function blocks may differ depending upon the manner in which one or more embodiments the present invention are programmed.

The computer executable code may be uploaded to, and executed by, a machine comprising any suitable architecture. Typically, the machine is a computer platform having hardware such as one or more central processing units, a random access memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor hardware, read-only memory for storing software, random access memory, and non-volatile storage. Other hardware, conventional and/or custom, may be included.

All examples and conditional language recited herein are intended for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

APPENDIX

Figure 6:
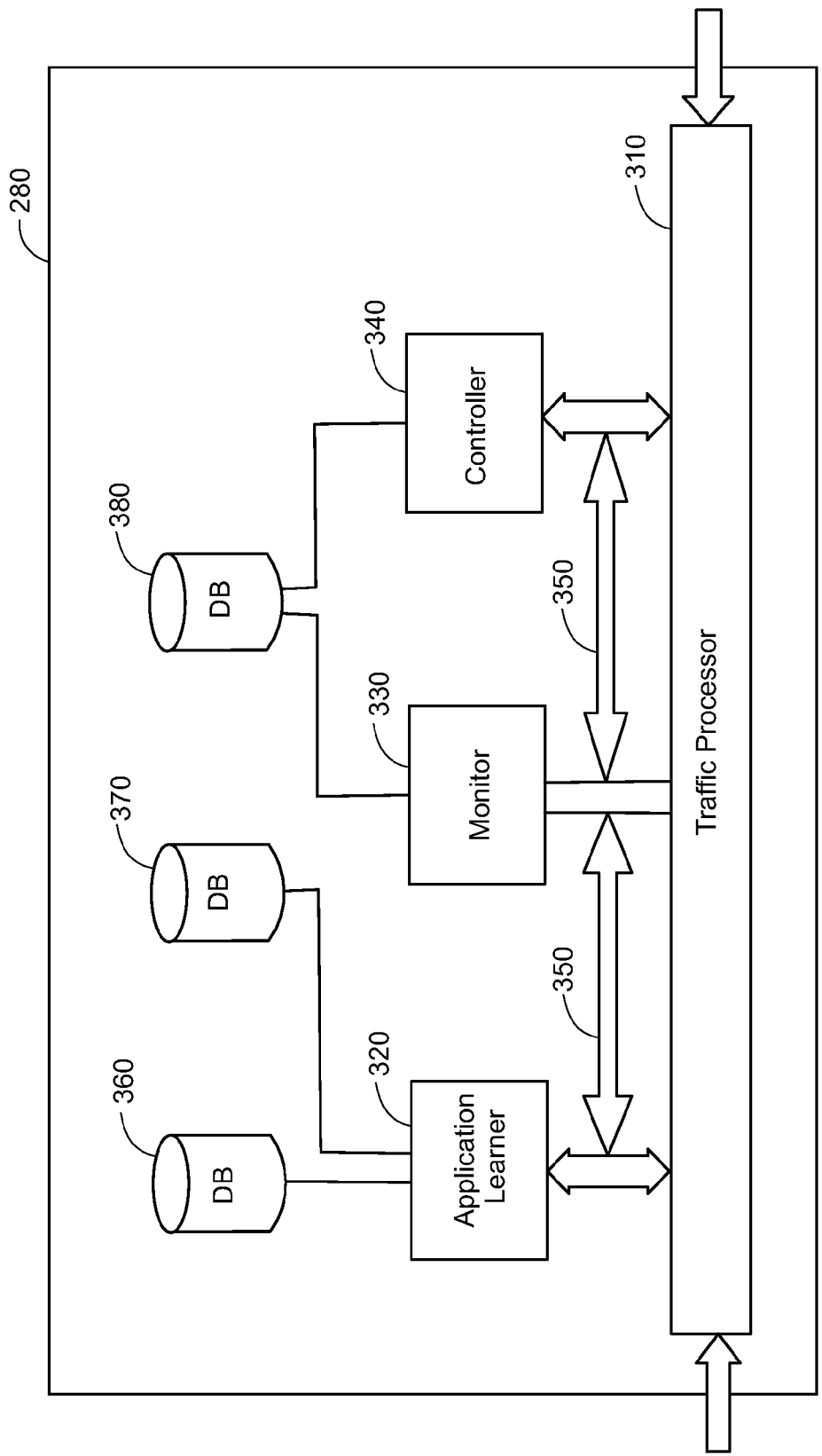
FIG. 6 shows a block diagram of a service level management system that is fabricated in accordance with one or more embodiments of the present invention.

FIG. 6 shows a block diagram of SLM system 280 that is fabricated in accordance with one or more embodiments of the present invention. As shown in FIG. 6, SLM system 280 comprises traffic processor 310, application learner 320, monitor 330, and controller 340 connected to common bus 350. As further shown in FIG. 6, SLM system 280 also includes databases 360 and 370 that are coupled to application learner 320 and database 380 that is coupled to monitor 330 and controller 340. In accordance with one or more further embodiments, SLM system 280 includes a single database commonly coupled to application learner 320, monitor 330, and controller 340.

In accordance with one or more embodiments, traffic processor 310 receives HTTP requests submitted by clients 210-1-210-N as well as replies sent from web servers 220-1-220-M and application servers 230-1-230-Q (refer to FIG. 2). In particular, once a session is established with one of clients 210-1-210-N, a client connection handler (not shown) is allocated. The client connection handler waits for data, for example, an HTTP request submitted by the client, and once received, the data is sent to a parser (not shown). In accordance with one or more embodiments of the present invention, the parser and the client connection handler are part of traffic processor 310.

While processing the request, the parser returns a context of the request where a context is a joined HTTP request-reply entity. Context fields include, but are not limited to, a site name, an HTTP method, a URL, request parameters, HTTP cookies, an HTTP status code, an HTTP server, an HTTP content type, an HTTP content length, an HTML title field, and the like. In accordance with one or more such embodiments: (a) the context is sent to application learner 320, monitor 330, and controller 340; and (b) the incoming request is forwarded to one of web servers 220-1-220-M or application servers 230-1-230-Q.

When a reply, for example, an HTTP response, is sent from one of web servers 230-1-230-M or application servers 230-1-230-Q, a web server (WS) connection handler (not shown) in traffic processor 310 is allocated. The WS connection handler waits until the header of the response arrives, and then forwards the header to the parser. Then, the parser sends the context to application learner 320, monitor 330, and controller 340. In addition, the incoming response is sent to the client through the respective client connection handler, i.e., the response is sent to the client that initiated the request.

In accordance with one or more embodiments of the present invention: (a) application learner 320 identifies web applications and their transactions and modules; and (b) registers the learned information in a classify data structure (CDS). In accordance with one or more such embodiments, the CDS includes: (a) a list of identified sites; (b) for each site, a list of its applications; and (c) for each application, a list transactions and modules that construct the application where a module is a group of transactions. In accordance with one or more such embodiments, application learner 320 further generates, for example, for display purposes, a site tree which includes all discovered applications that belong to a designated site. In accordance with one or more such embodiments, the CDS is used in real-time to classify incoming requests to applications, and the site tree and the CDS are saved in database 370.

Figure 8:
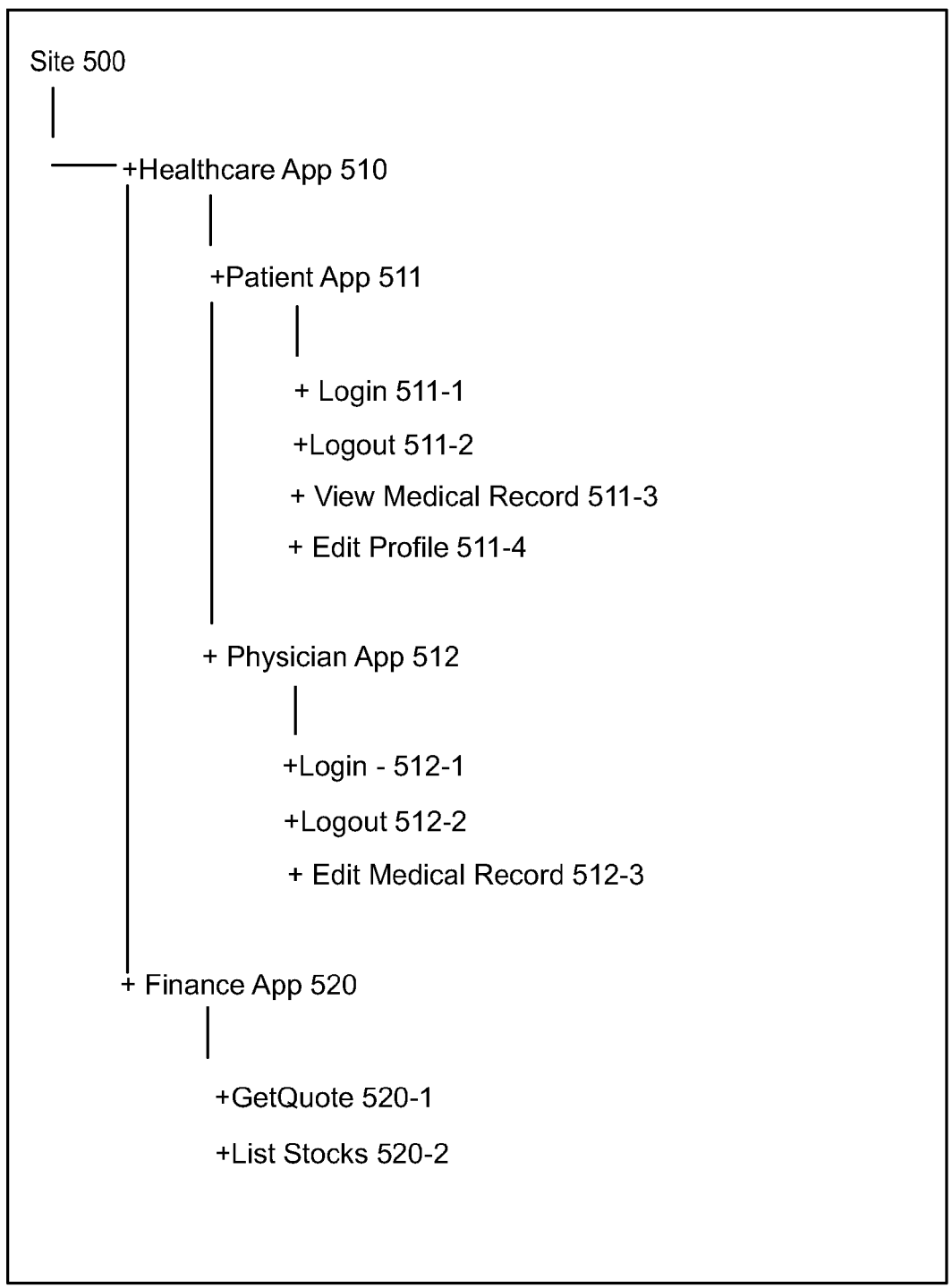
FIG. 8 provides an example of a site tree that can be generated using one or more embodiments of the present invention.

FIG. 8 provides an example of a site tree. As shown in FIG. 8, web site 500 has two applications: healthcare application 510 and finance application 520. As further shown in FIG. 8, healthcare application 510 is comprised of two applications, patient application 511 and physician application 512. As still further shown in FIG. 8: (a) patient application 511 includes the following transactions: Login 511-1, Logout 511-2, View Medical Record 511-3, and Edit Profile 511-4; and (b) physician application 512-1 includes the following transactions: Login 512-1, Logout 512-2, and Edit Medical Record 512-3. As still further shown in FIG. 8, finance application 520 includes the following transactions: GetQuote 520-1 and ListStocks 520-1.

In accordance with one or more embodiments of the present invention, application learner 320 performs at least three tasks that include: classifying, learning, and collecting. The classifying task includes determining, on-the-fly, for each context (i.e., parsed request) whether the incoming request belongs to a previously discovered application, and if so an application identification (ID) number is assigned to the context. Unidentified context messages may be further processed for the purpose of learning new applications and their transactions and modules. The collecting task is invoked for a reply message, and it decides if the context should be collected. A context to be collected is saved, in chronological order, in database 360. The learning task is invoked upon at predefined periods of time, or whenever the number of collected contexts is above a predefined threshold. The learning task processes data stored in database 360, and attempts to discover a new application using a plurality of application definers and correlation processes. The application definers include conditions that are checked against context data in database 360. An example of application definers are a path of a cookie, the name of a parameter, and so on. If one of the application definers is satisfied, then a new application is found and inserted into the CDS in an entry for the relevant site. That is, a new entry is created and the application ID, together with the URL, are added to the entry. In accordance with one or more embodiments of the present invention, the learning task for applications can also be performed by correlating a plurality of saved contexts that share a common property, such as URL and parameter.

In accordance with one or more embodiments of the present invention, monitor 330 executes activities related to the generation of statistics respective of the operation of the web servers and their respective applications. The statistics include, but are not limited to, measuring throughput, response time, number of errors, and so on. In accordance with one or more embodiments of the present invention, the statistics are kept in database 380 on a per server basis, on a per application basis, and on a per application/server combination basis. In accordance with one or more embodiments of the present invention, a plurality of reports are produced that are based on the gathered statistics. These reports can be presented by means of a graphical user interface (GUI) and/or sent to a system administrator by email.

Controller 340 executes tasks that optimize the performance of each web application executed by the web and application servers. These tasks include, but are not limited to, scheduling requests to reduce response time, shaping traffic to balance the load, recovery actions when one of the servers fails, redirecting of requests, and so on. Controller 340 performs such tasks according to a set of policies predetermined for each server, application, transaction, and module in an application. Generally, a policy defines an allowed value range for each status parameter and the actions to be taken if a status parameter is not within its range. Each policy is assigned a priority and time periods that the policy should be activated and the users to which it is relevant. For example, a policy may define a maximum allowable latency value that is for an application and a threshold from which corrective actions should be taken. The corrective action may be, but is not limited to, the transfer of requests to a less busy server. As another example, a policy may define the maximum allowable throughput for an application, and the corrective action may be stalling traffic directed to the server that executes the application. It should be noted that if a policy includes two or more corrective actions, then each of the actions may be assigned with a different priority.

Figure 7:
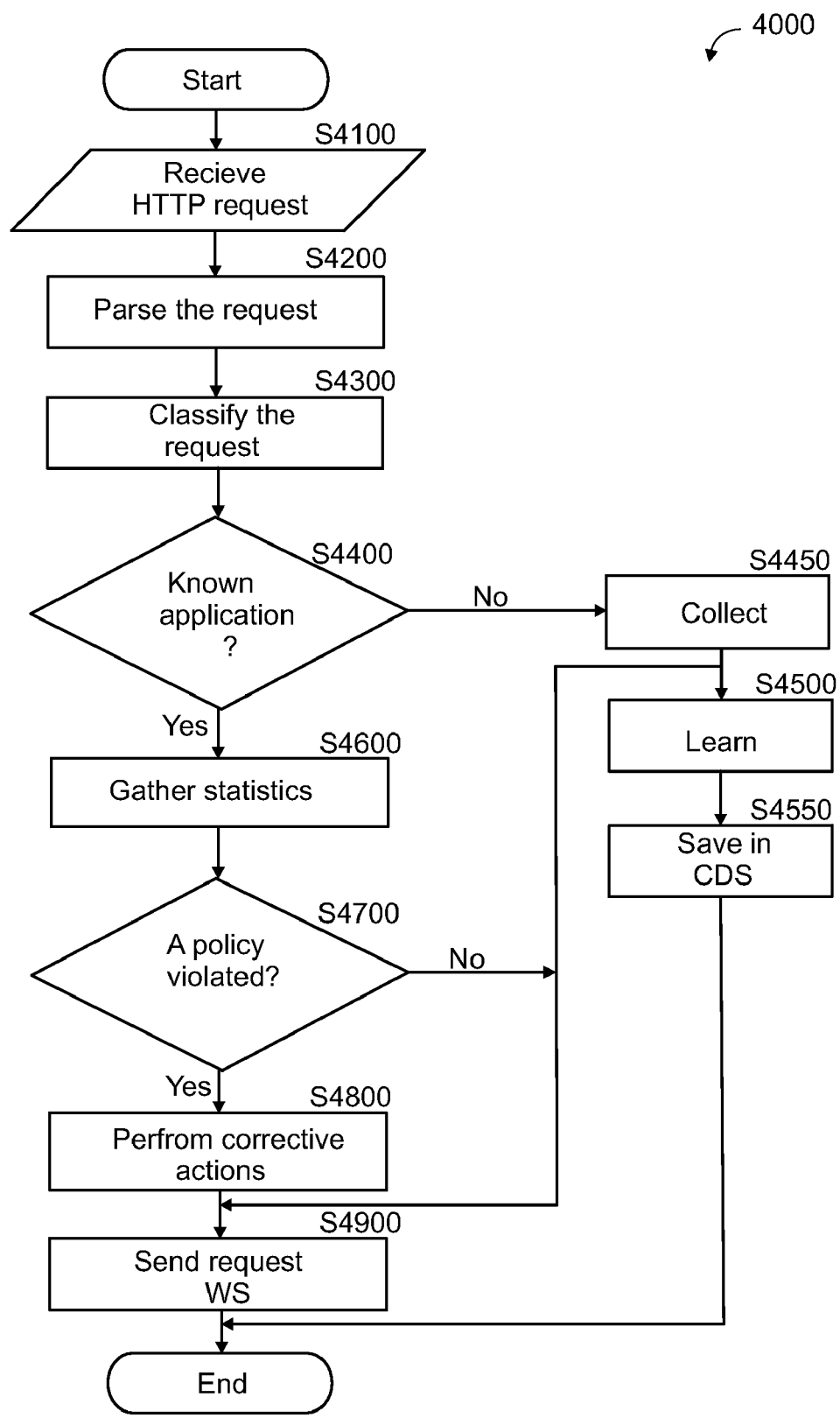
FIG. 7 shows a flowchart that describes an operation of a network sniffer in accordance with one or more embodiments of the present invention.

FIG. 7 shows flowchart 4000 that describes an operation of network sniffer 280 in accordance with one or more embodiments of the present invention. At step S4100 of flowchart 4000 of FIG. 7, an HTTP request sent from one of clients 210-1-210-N is received at SLM system 280. Control is then transferred to step S4200 of flowchart 4000.

At step S4200 of flowchart 4000, the HTTP request is parsed to generate a context of the request. Control is then transferred to step S4300.

At step S4300 of flowchart 4000, the request is classified to determine whether the request belongs to a known or unknown application. Classification is performed by matching the context against the CDS and a plurality of classification filters. If filtering results in an application ID, the incoming request belongs to a known (i.e., learned) application. Control is then transferred to decision step S4400.

At decision step S4400 of flowchart 4000, SLM system 280 determines whether an application ID was detected, and if so, control transfers to step S4600. Otherwise, control transfers to step S4450.

At step S4450 of flowchart 4000, the context is stored in database 360. Control is then transferred to step S4500 of flowchart 4000, and the request is sent to step S4900.

At step S4500 of flowchart 4000, application learner 320 discovers the applications, and preferably the applications' transactions and modules related to the context. Control is then transferred to step 4550.

At step S4550 of flowchart 4000, the learned information is stored in a CDS format in database 370. Control is then sent to the exit.

At step S4600 of flowchart 4000, statistics respective of the application are gathered. That is, at least the following status parameters: throughput, response time, hits per second, latency and number of returned errors are measured and stored in database 380. Control is then transferred to decision step 4700.

At decision step S4700 of flowchart 4000, SLM 280 checks whether at least one of the policies defined for the application is violated. Namely, it is determined whether the measured status parameters are within an allowed range, and if so, control is transferred to step S4900. Otherwise, control is transferred to step S4800.

At step S4800 of flowchart 4000, one or more corrective actions, as defined in the violated policy, are taken. Examples for such actions were discussed above. Control is then transferred to step S4900.

At step S4900 of flowchart 4000, the request is sent to one of web servers 220-1-220-M or application servers 230-1-230-Q.

In light of the above, one of ordinary skill in the art can modify flowchart 4000 routinely and without undue experimentation to provide a flowchart for use in processing HTTP replies sent from web servers or application servers to clients.

In accordance with one or more embodiments of the present invention, SLM system 280 and method described herein further implement a feedback mechanism. Specifically, after a corrective action is taken at step 4800, SLM system 280 monitors the result of the action, i.e., whether the monitored parameters values improved due to the corrective action or actions. Accordingly, SLM system 280 updates controller 340 with the next corrective actions to activate. For example, if an action has not made a difference, this action would be less likely to be activated when a subsequent request is received.

In accordance with one or more embodiments of the present invention, SLM system 280 tracks transactions and actual users that access the web applications in web servers 220-1-220-M and application servers 230-1-230-Q. In accordance with one or more embodiments of the present invention, tracking users is performed by: (a) adding a token (for example, a cookie) to the HTTP traffic; (b) identifying existing cookies that are used by existing user-management mechanisms; (c) tracking SSL sessions; or (d) any combination thereof. The ability to track user activity allows for identifying transactions. Specifically, SLM system 280 detects navigation routes of users, i.e., how users move between applications' transactions; compares detected routes; and deduces from collected information which parts of the routes comprise independent transactions. It should be noted that not all navigation routes are considered as transactions or identified as such.

Figure 9:
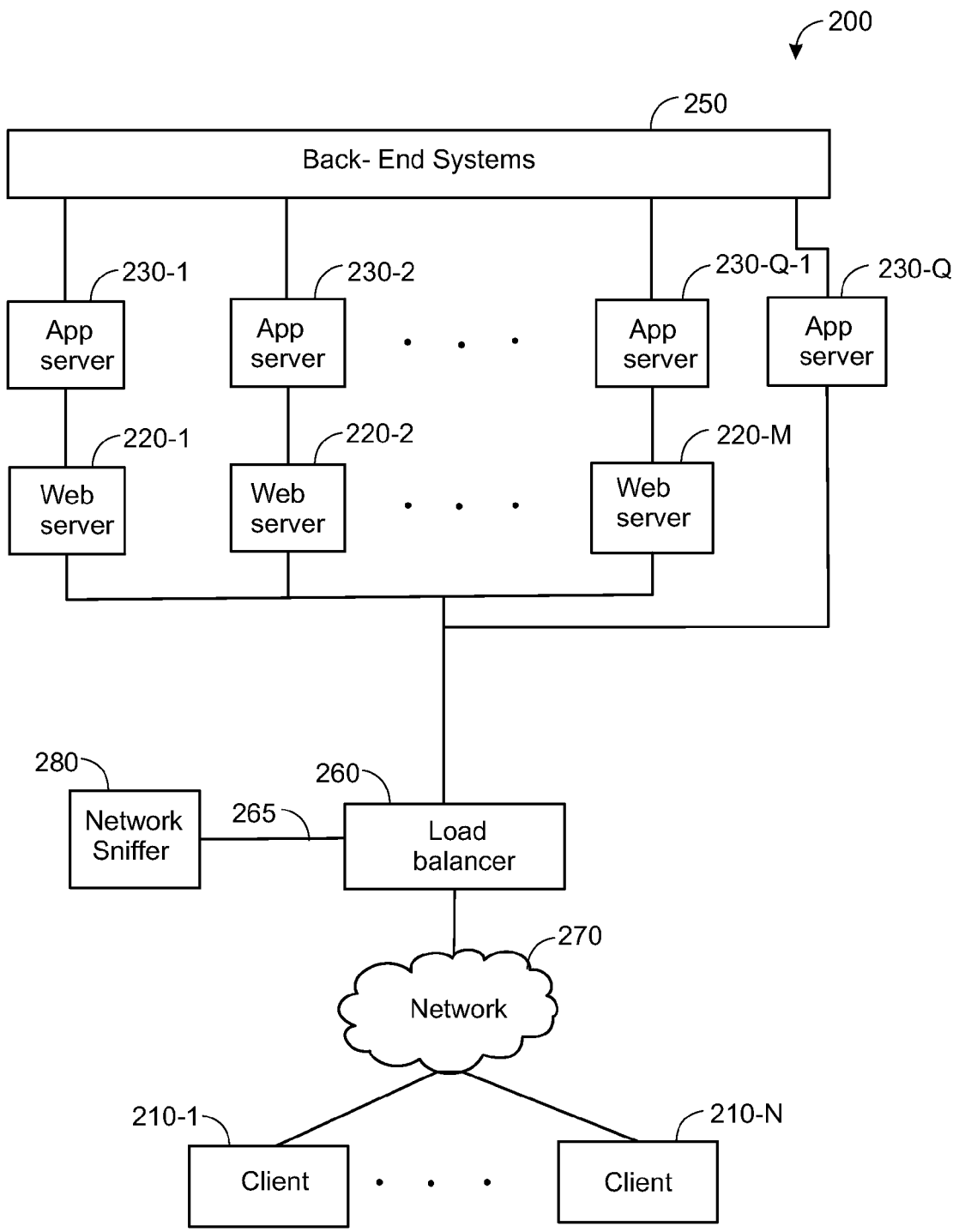
FIG. 9 shows an exemplary data center utilized to describe one or more embodiments of the present invention wherein a service level management system is configured as a network sniffer.

In accordance with one or more embodiments of the present invention, SLM system 280 is embodied as a sniffer. As shown in FIG. 9, network sniffer 280 is connected to load balancer 260 through dedicated port 265, for example, a switched port analyzer (SPAN). Thus traffic on any port of load balancer 260 is copied to port 265. As such, network sniffer 280 receives any traffic captured by load balancer 260.

Figure 10:
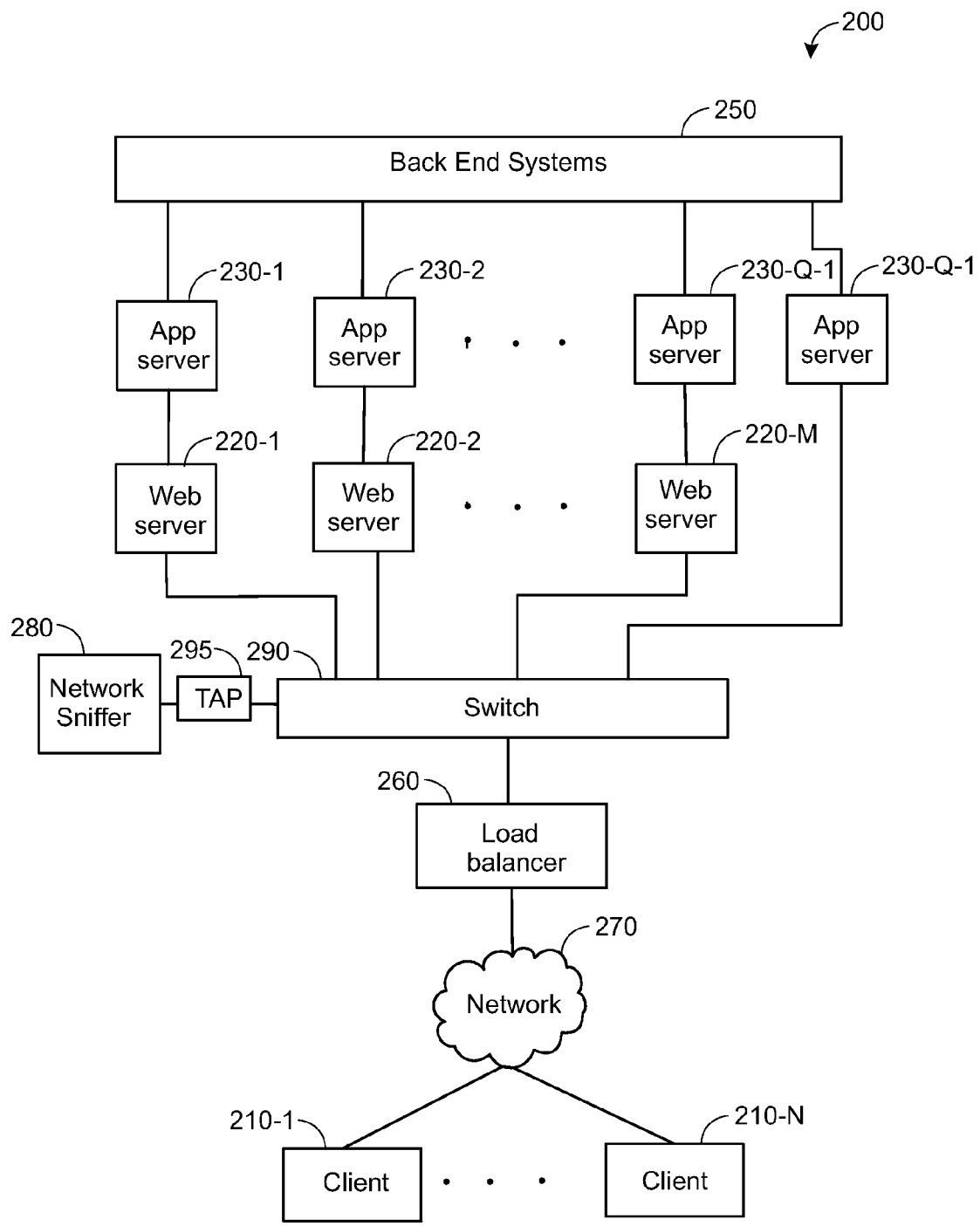
FIG. 10 shows an exemplary data center utilized to describe one or more embodiments of the present invention wherein a service level management system is configured as a network sniffer in a first configuration.

In accordance with one or more further embodiments, in FIG. 10, network sniffer 280 is coupled to switch 290, and switch 290 is connected, in turn, to load balancer 260 and web servers 220-1-220-M and/or application servers 230-1-230-Q. In accordance with one or more such embodiments, network sniffer 280 is connected to switch 290 through a dedicated port, which dedicated port may be a SPAN or network tap 295. Network tap 295 is a device which provides access to data flowing from and to load balancer 260. As shown in FIG. 10, switch 290 is connected between load balancer 260 and servers 220-1-220-M and application servers 230-1-230-Q, and switch 290 is also coupled to network tap 295. That is, network tap 295 passes traffic between load balancer 260 and switch 290 to its port (for example, monitor port) which is connected to network sniffer 280 to enable it to listen.

Figure 11:
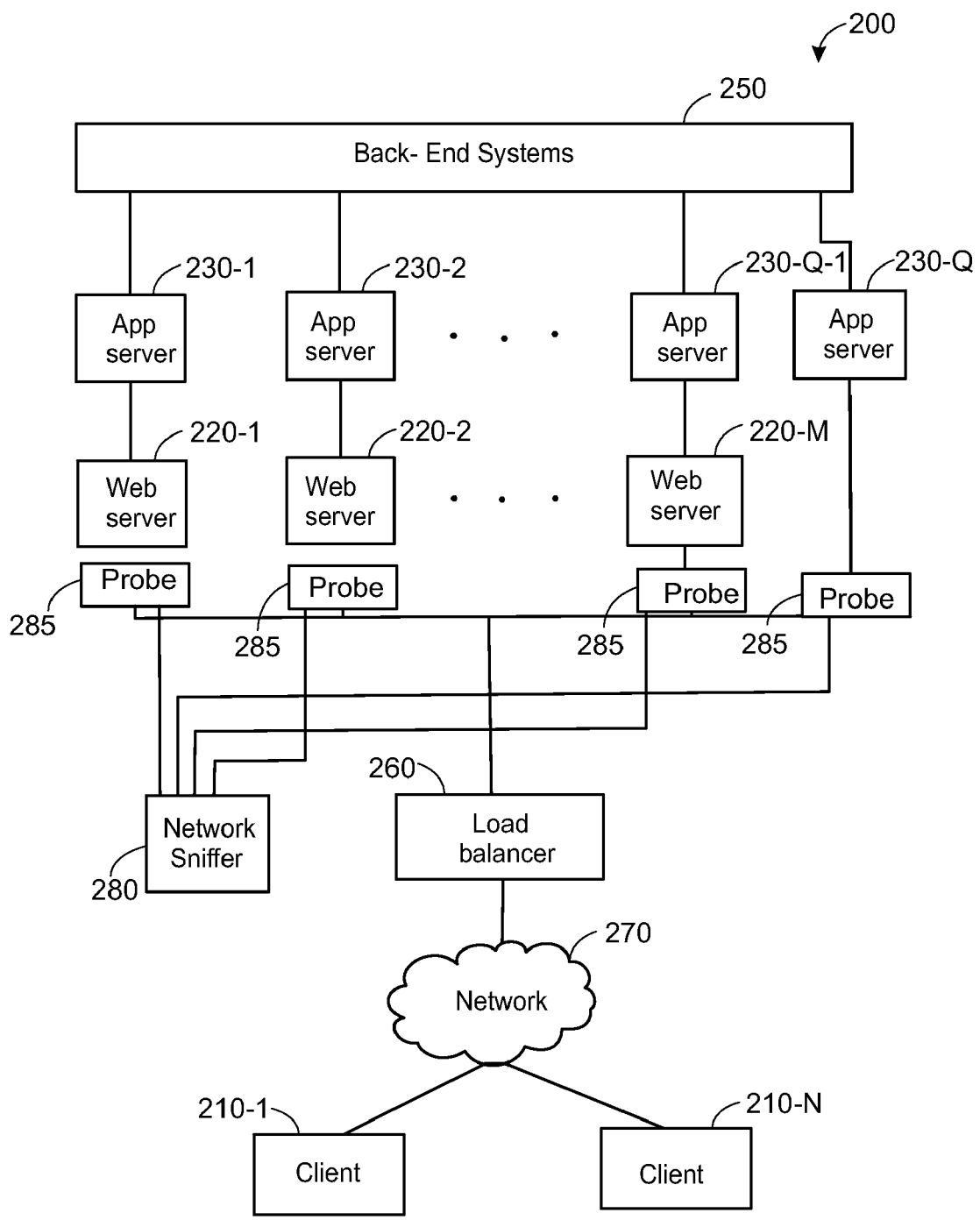
FIG. 11 shows an exemplary data center utilized to describe one or more embodiments of the present invention wherein a service level management system is configured as a network sniffer in a second configuration.

In accordance with one or more still further embodiments, in FIG. 11, a plurality of traffic probes 285 are coupled to web servers 220-1-220-M and/or application servers 230-1-230-Q. In accordance with one or more such embodiments, traffic probes 285 monitor traffic flows from and to web servers 220-1-220-M or application servers 230-1-230-Q, and traffic probes 285 forward monitoring events to network sniffer 280. Specifically a probe parses the traffic, classifies it to transactions, and measures the various traffic parameters, such as latency, throughput, hits per second, number of errors, and so on. Then, each traffic probe 285 sends these measured parameters to network sniffer 280 where all measurements from all traffic probes 285 are aggregated.

Figure 12:
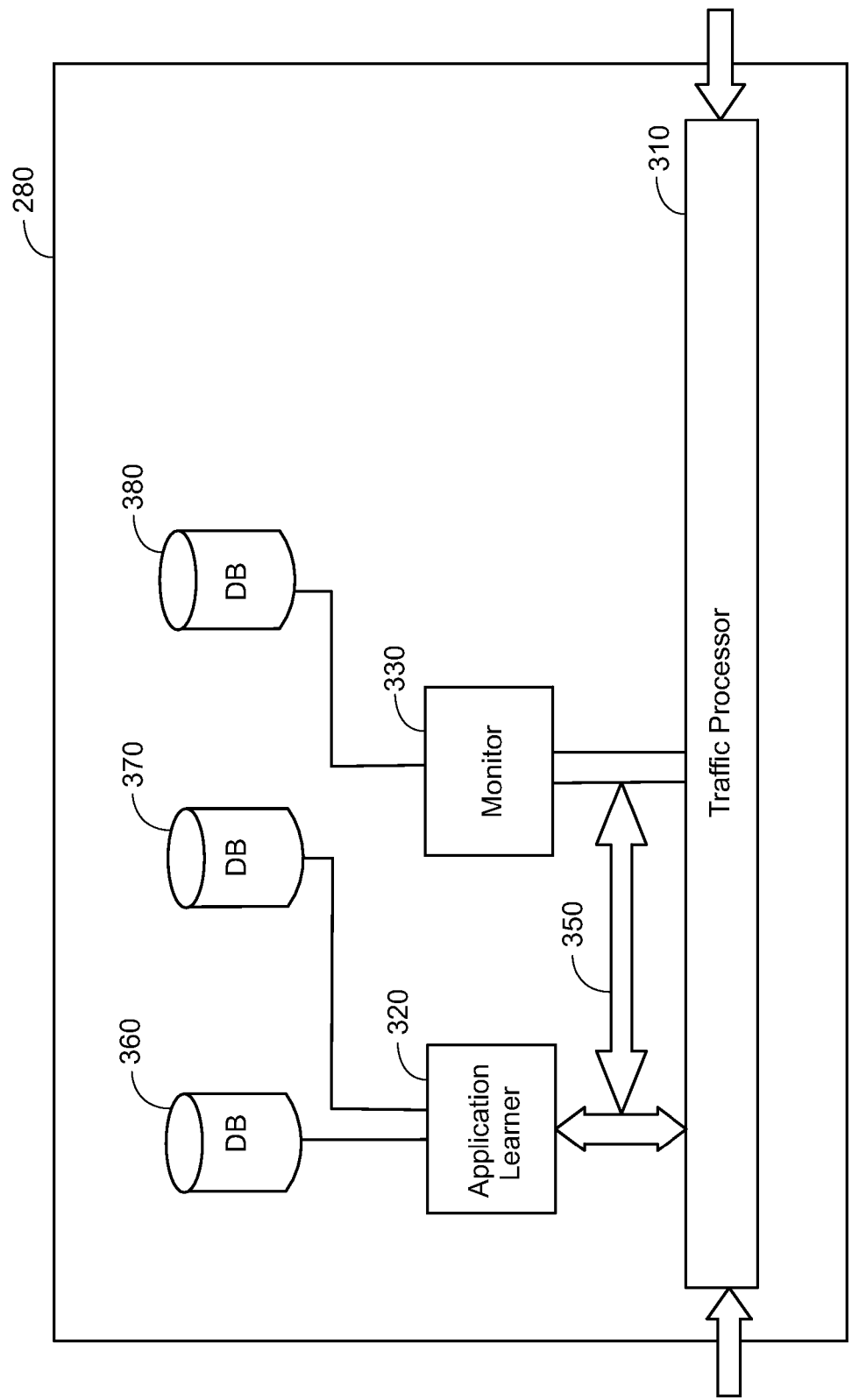
FIG. 12 shows a block diagram of a network sniffer that is fabricated in accordance with one or more embodiments of the present invention.

FIG. 12 shows a block diagram of network sniffer 280 that is fabricated in accordance with one or more embodiments of the present invention. As shown in FIG. 12, network sniffer 280 composes traffic processor 310, application learner 320, and monitor 330 connected to common bus 350. As shown in FIG. 12, network sniffer 280 further includes databases 360 and 370 coupled to application learner 320 and database 380 coupled to monitor 330. In accordance with one or more further embodiments, network sniffer 280 includes a single database commonly coupled to application learner 320 and monitor 330. Further, in accordance with one or more still further embodiments of the present invention, network sniffer 280 may also include a controller adapted to control load balancer 260 to perform corrective actions to deliver services according to predefined SLAs.

Network sniffer 280 may also be embodied as shown in FIG. 6. As shown in FIG. 6, network sniffer 280 includes controller 340 coupled to common bus 350, traffic processor 310, and database 380. Traffic processor 310 receives HTTP requests submitted by clients 210-1-210-N as well as replies sent from web servers 220-1-220-M and application servers 230-1-230-Q (refer to FIG. 2). Specifically, once a session is established with one of clients 210-1-210-N, a client connection handler (not shown) is allocated. The client connection handler waits for data, i.e., a HTTP request submitted by the client, and once received, the data is sent to a parser (not shown). Both the parser and the client connection handler are part of traffic processor 310. While processing the request, the parser returns a context of the request. The context is sent to application learner 320, monitor 330, and controller 340.

When a reply, for example, an HTTP response, is sent from one of web servers 230-1-230-M or application servers 230-1-230-Q, a web server (WS) connection handler (not shown) in traffic processor 310 is allocated. The WS connection handler waits until the header of the response arrives, and then forwards the header to the parser. Then, the parser sends the context to application learner 320, monitor 330, and controller 340. In accordance with one or more embodiments of the present invention: (a) application learner 320 identifies web applications and their transactions and modules; and (b) registers the learned information in a CDS, as described above. As described above, application learner 320 further generates for display purposes a site tree, which includes all discovered applications that belong to a designated site (refer to FIG. 8). In addition, as was described above, application learner 320 performs at least three tasks that include classifying, learning, and collecting. FIG. 7 shows flowchart 4000 that describes operation of network sniffer 280 in accordance with one or more embodiments of the present invention.

What is claimed is:

1. A method for monitoring performance of a data center that comprises:

monitoring hypertext transfer protocol packets that flow from a client to a web or application server through a network to which the client and the web or application server are connected and from the web or application server to the client through the network at a traffic flow location between the client and the web or application server, including identifying hypertext transfer protocol request packets to the web or application server that are initiated from the client and including identifying hypertext transfer protocol reply packets from the web or application server to the client, the hypertext transfer protocol request packets comprising at least one request to the web or application server, while the hypertext transfer protocol reply packets comprising at least one response from the web or application server;

analyzing the hypertext transfer protocol packets to determine those hypertext transfer protocol reply packets that are responsive to at least some of the hypertext transfer protocol request packets;

on a basis of the hypertext transfer protocol request packets and the responsive hypertext transfer protocol reply packets, determining one or more of application, network, and back-end latency measures wherein:

the application latency measure is a time it takes for an application running on the web or application server to respond to a request initiated by the client, the network latency measure is a time that it takes for the hypertext transfer protocol packets to go through the network between the client and the web or application server, and the back-end latency is a time required for a back-end system coupled to the web or application server to execute the request and respond to the web or application server.

2. The method of claim 1 wherein the network latency measure includes server round-trip-time (RTT) and overhead wherein overhead includes delays due to packet loss or other network failures.

3. The method of claim 1 wherein the determining the one or more of the application, network, and back-end latency measures includes determining at least two of the application, network and back-end latency measures.

4. The method of claim 1 wherein the determining the one or more of the application, network, and back-end latency measures includes determining all three of the application, network and back-end latency measures.

5. A method for monitoring performance of a data center that comprises:

monitoring hypertext transfer protocol packets that flow from a client to a web or application server through a network to which the client and the web or application server are connected and from the web or application server to the client through the network at a traffic flow location between the client and the web or application server, including identifying hypertext transfer protocol request packets to the web or application server that are initiated from the client and including identifying hypertext transfer protocol reply packets from the web or application server to the client, the hypertext transfer protocol request packets comprising at least one request to the web or application server, while the hypertext transfer protocol reply packets comprising at least one response from the web or application server;

analyzing the hypertext transfer protocol packets to determine those hypertext transfer protocol reply packets that are responsive to at least some of the hypertext transfer protocol request packets;

based on the monitoring and analyzing of the hypertext transfer protocol packets, controlling a client round trip time (RTT) counter that measures a time between detecting a hypertext transfer protocol packet headed to the client and detecting its reply; and based on the monitoring and analyzing of the hypertext transfer protocol packets, controlling a server round trip time (RTT) counter that measures a time between detecting a hypertext transfer protocol packet headed to the web or application server and detecting its reply.

6. The method of claim 5 wherein:

controlling the client RTT counter comprises a monitor adding the time between a hypertext transfer protocol reply packet from the web or application server and its acknowledgement to the client RTT counter; and controlling the server RTT counter comprises the monitor adding the time between a hypertext transfer protocol request packet from the client and its acknowledgement to the server RTT counter.

7. The method of claim 6 which further comprises summing the client RTT counter and the server RTT counter over a connection time.

8. A method for monitoring performance of a data center that comprises:

monitoring hypertext transfer protocol packets that flow from a client to a web or application server through a network to which the client and the web or application server are connected and from the web or application server to the client through the network at a traffic flow location between the client and the web or application server, including identifying hypertext transfer protocol request packets to the web or application server from the client and including identifying hypertext transfer protocol reply packets from the web or application server to the client, the hypertext transfer protocol request packets being used to send requests to the web or application server;

analyzing the hypertext transfer protocol packets to determine those hypertext transfer protocol reply packets that are responsive to at least some of the hypertext transfer protocol request packets; and based on the monitoring and analyzing of the hypertext transfer protocol packets, updating one or more of an application server time-to-first-byte (TTFB) counter, an application server time-to-last-byte (TTLB) counter, a web server-network TTLB counter, a client-network TTLB counter, a web server round-trip-time (RTT) counter, a client RTT counter, a back-end system TTFB counter, a client-network overhead counter, and a web server-network overhead counter, at least one of the application server TTFB counter, the application server TTLB counter, the web server-network TTLB counter, the client-network TTLB counter, the web server RTT counter, the client RTT counter, the back-end system TTFB counter, the client-network overhead counter, and the web server-network overhead counter being used to determine at least one of application, network, and back-end latency measures, wherein the application latency measure is a time it takes for an application running on the web or application server to respond to a request initiated by the client, the network latency measure is a time that it takes for packets to go through the network between the client and the web or application server, and the back-end latency is a time required for a back-end system coupled to the web or application server to execute the request and respond to the web or application server.

9. The method of claim 8 wherein the client-network overhead counter is a measure of client packet loss and the server-network overhead counter is a measure of server packet loss.

10. The method of claim 9 wherein:

the monitoring and analyzing are executed by a monitor that adds time elapsed between any re-transmissions of the hypertext transfer protocol reply packets that were lost in client-network transmission to the client-network overhead counter; and the monitor adds time elapsed between any re-transmissions of the hypertext transfer protocol reply packets that were lost in the server-network transmission to the server-network overhead counter.

11. The method of claim 10 wherein, if a re-transmitted hypertext transfer protocol reply packet is inspected by the monitor, the monitor adds the time elapsed to the client-network overhead counter; otherwise, the monitor adds the time to the server-network overhead counter.

12. The method of claim 8 further comprising:

starting the application server TTFB counter when a monitor detects the last the hypertext transfer protocol packet of the request, the monitor being connected to execute the monitoring and analyzing of the hypertext transfer protocol request and reply packets;

stopping the application server TTFB counter when the monitor detects the first hypertext transfer protocol packet of the reply; and subtracting the server RTT time from the application server TTFB counter.

13. The method of claim 12 wherein the method further comprises:

averaging application server TTFB counters for a plurality of request-and-response exchanges related to the application server.

14. The method of claim 8 wherein the back-end system TTFB counter measures time between the back-end system receiving the last hypertext transfer protocol packet of the request and sending the first packet of the reply.

15. The method of claim 14 wherein a back-end latency measure is determined using the application server TTLB counter and the back-end system TTFB counter.

16. The method of claim 15 wherein a contribution to a latency measure of a network between the application server and the back-end system is determined as a function of the back-end latency measure and the application server TTFB counter.

17. The method of claim 8 wherein data in the form of one or more of minimum, maximum, average, and standard deviation values of the application, network, and back-end latency measures is generated for one or more of each client, server, back-end system, application and/or module within an application.

18. The method of claim 17 wherein the data are generated for various durations of time.

19. The method of claim 18 wherein the data are displayed utilizing a graphical user interface.

20. The method of claim 8 wherein the updating includes selectively updating a plurality of the application server time-to-first-byte (TTFB) counter, the application server time-to-last-byte (TTLB) counter, the web server-network TTLB counter, the client-network TTLB counter, the web server round-trip-time (RTT) counter, the client RTT counter, the back-end system TTFB counter, the client-network overhead counter, and the web server-network overhead counter.

* * * * *